(12) United States Patent
Kniajanski et al.

(10) Patent No.: US 8,039,558 B2
(45) Date of Patent: Oct. 18, 2011

(54) POLYMER COMPOSITION WITH ELASTOMERIC PROPERTIES AT WIDE TEMPERATURE RANGES AND PROCESS FOR THE PREPARATION THEREOF

(75) Inventors: Sergei Kniajanski, Saltillo (MX); Maricela Garcia-Zamora, Saltillo (MX); Sergio Corona-Galvan, Madrid (ES); Rodolfo Flores-Flores, Tampico (MX); Marcela Garcia-Ramirez, Tampico (MX); Gregorio Cadena-Pliego, Saltillo (MX)

(73) Assignees: Dyansol Elastomeros, S.A. de C.V., Tam (MX); Centro de Investigacion en Quimica Aplicada (CIQA), Coah (MX)

( * ) Notice: Subject to any disclaimer, the term of this patent is extended or adjusted under 35 U.S.C. 154(b) by 0 days.

(21) Appl. No.: 12/845,073

(22) Filed: Jul. 28, 2010

(65) Prior Publication Data
US 2010/0311907 A1     Dec. 9, 2010

Related U.S. Application Data

(62) Division of application No. 10/568,456, filed as application No. PCT/MX03/00064 on Aug. 15, 2003, now Pat. No. 7,851,552.

(51) Int. Cl.
*C08F 297/06* (2006.01)
*C08F 8/04* (2006.01)
*C08F 4/642* (2006.01)

(52) U.S. Cl. .................. 525/268; 525/332.9; 525/338; 525/940; 528/496; 528/497

(58) Field of Classification Search .................. 525/268, 525/338, 332.9, 940; 528/496, 497
See application file for complete search history.

(56) References Cited

U.S. PATENT DOCUMENTS

| | | | |
|---|---|---|---|
| 5,247,020 A * | 9/1993 | Nakano et al. | ................ 525/249 |
| 6,271,313 B1 | 8/2001 | Zambelli et al. | |
| 6,329,459 B1 | 12/2001 | Kang et al. | |

FOREIGN PATENT DOCUMENTS

| | | |
|---|---|---|
| EP | 0 324 398 A1 | 8/1989 |
| EP | 0 440 014 A2 | 8/1991 |
| EP | 0 639 618 A1 | 2/1995 |
| EP | 0 810 283 A1 | 12/1997 |

OTHER PUBLICATIONS

Caprio et al, "Structural Characteristics of Novel Styrene-Butadiene Block Copolymers . . . ," Macromolecules 2002, 35, 9315-9322.*

* cited by examiner

*Primary Examiner* — Fred M Teskin
(74) *Attorney, Agent, or Firm* — Browdy and Neimark, PLLC

(57) ABSTRACT

It is depicted a polymer composition with elastomeric properties at wide temperature ranges of the type comprising polymers and/copolymers resulting from substituted or unsubstituted vinyl aromatic monomers and from dienic monomers, which is homogeneous and compatible in nature, with such composition being based on stereoregular polymers and without requiring the additional use of compatibilizing agents. Likewise, it is depicted the process to obtain the same, as well as to hydrogenise them, without requiring the use of additional catalyzers or processes.

25 Claims, 1 Drawing Sheet

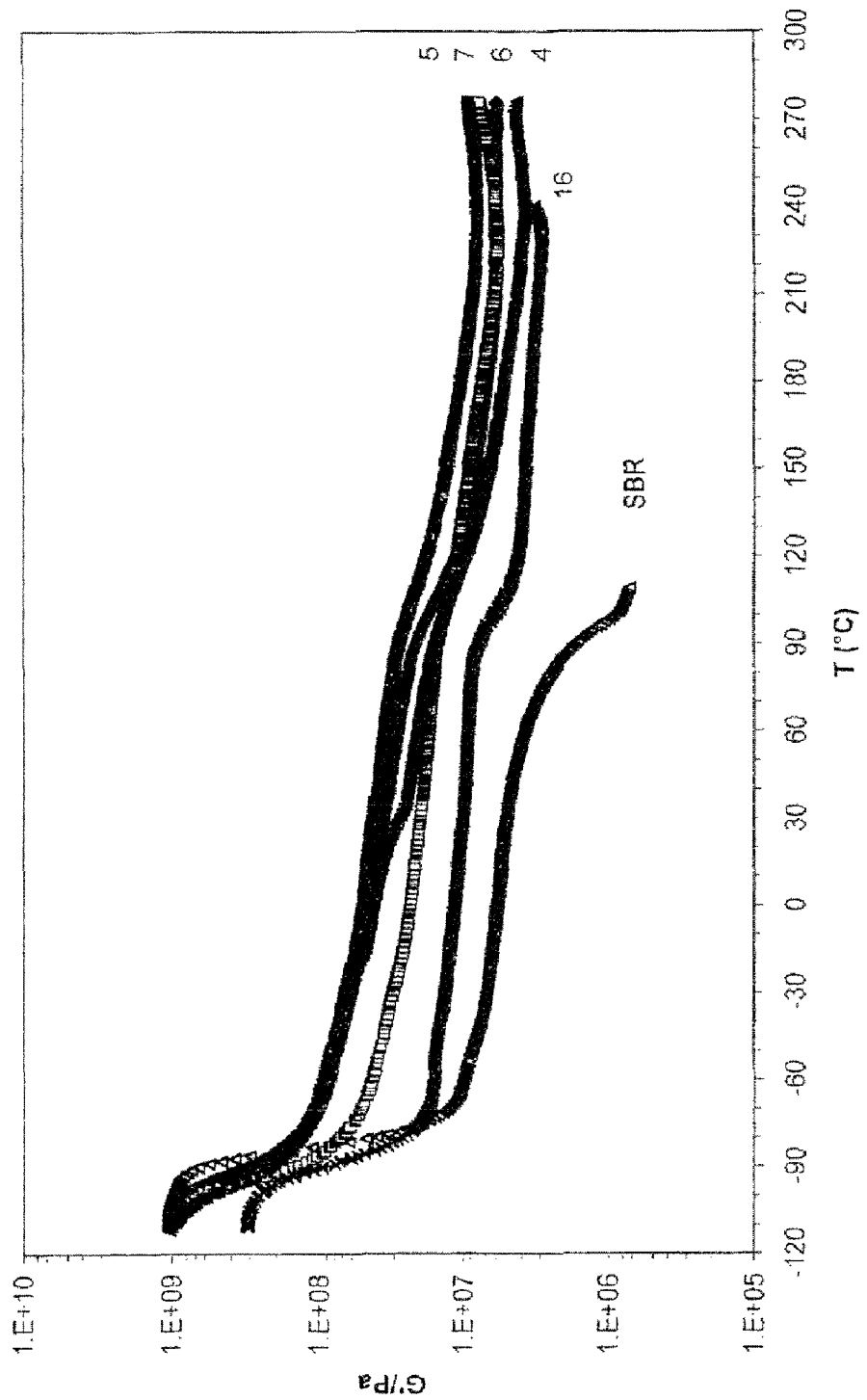
FIGURE

POLYMER COMPOSITION WITH ELASTOMERIC PROPERTIES AT WIDE TEMPERATURE RANGES AND PROCESS FOR THE PREPARATION THEREOF

CROSS-REFERENCE TO RELATED APPLICATIONS

The present application is a divisional of application Ser. No. 10/568,456, filed Oct. 6, 2006, which is a 371 national stage of international application no. PCT/MX03/00064, filed Aug. 15, 2003, now U.S. Pat. No. 7,851,552. The entire contents of prior applications are incorporated herein by reference.

FIELD OF THE INVENTION

The present invention relates to the techniques used in obtaining polymer compositions and, more particularly, it relates to a copolymer composition having elastomeric properties at wide temperature ranges.

BACKGROUND OF THE INVENTION

There is a vast amount of polymer composition applications wherein the elements or objects therefrom require having elastomeric properties, that is, to exhibit extensibility and flexibility properties allowing them to recover their shape after being considerably extended.

Due to the above, a great variety of materials having elastomeric properties have been developed over time, with styrene-butadiene copolymers being among the most renowned and widely used ones:

Although it is possible to find in the state of the art a great variety of elastomeric polymer compositions having various mechanical or physical properties such as hardness, tensile strength, or modulus of elasticity, among others, the compositions known so far lose their elastomeric properties with temperature, which limits the optimal performance thereof when they are to be used in high-temperature applications.

With the development of more effective polymerization catalyzers, such as the one depicted in the patent application MX 9801717, it has been possible to control the structure of polymers, allowing thus to obtain regularity in chains. Thus, in the case of styrene elastomers, syndiotactic polystyrene has been used in order to achieve beneficial results for the properties of the polymer compositions therefrom.

For instance, U.S. Pat. No. 5,260,394 depicts a syndiotactic polystyrene copolymer with inserts of olefin and/or dienic monomers exhibiting proper chemical and thermal resistance properties, in addition to allowing an appropriate processing and good compatibility with other compositions. The copolymers depicted therein aim to have materials with good processing by injection molding due to their low glass transition temperature.

Likewise, U.S. Pat. No. 5,352,727 depicts a syndiotactic polystyrene composition modified with rubber aiming to provide such composition with better processing properties when it is reprocessed after being used once, keeping its mechanical and heat decomposition resistance properties after being reprocessed.

Generally, other documents such as U.S. Pat. Nos. 6,046,275; 6,191,197; 5,352,727; 5,260,394; 5,543,462; and 5,777,028 use various mixtures of syndiotactic polystyrene with other polymers or copolymers allowing to modify the mechanical and processing properties of such a polymer compositions.

However, none of these documents introduce a composition having elastomeric properties at wide temperature ranges since, due to the nature of the compatibilizing agents normally used to obtain compositions in stereoregular polymers, such compositions cannot be used at low temperatures and therefore the use of this kind of materials continues to be limited to temperatures over −4° F.

According to the above, we have pretended to overcome the disadvantages of known elastomeric compositions by obtaining a polymer composition not also having elastomeric properties at wide temperature ranges, but which can be used at high temperatures and keeps its impact strength, chemical, mechanical, and wear resistance properties under high temperatures, in addition to keep its elastomeric properties at temperatures under −4° F.

OBJECTS OF THE INVENTION

Considering the limitations of the compositions depicted in the previous art, it is an object of the present invention to provide a polymer composition having elastomeric properties at wide temperature ranges, which is homogeneous and compatible, such composition resulting from stereoregular polymers and not requiring the use of additional compatibilizing agents.

It is another object of the present invention to provide a polymer composition having elastomeric properties at wide temperature ranges which keeps its chemical, mechanical, and wear resistance properties, as well as its processing and impact strength properties.

Yet another object of the present invention is to provide a polymer composition having elastomeric properties at wide temperature ranges which is compatible with other polymer materials when being mixed with them.

Yet another object of the present invention is to provide a polymer composition having elastomeric properties at wide temperature ranges which may be properly processed as a film, by thermoforming, injection, or extrusion.

BRIEF DESCRIPTION OF THE DRAWINGS

Novel aspects considered to be characteristic of the present invention will be established with detail in the appended claims. However, the operation, as well as other objects and advantages thereof, will be better understood in the light of the following detailed description of a specific embodiment thereof, considered according to the appended FIGURE, wherein:

The FIGURE is a graph of the modulus of elasticity (G') of some embodiments of the polymer composition of the present invention which are illustrated in the example.

DETAILED DESCRIPTION OF THE INVENTION

It has been found that a combination of dienic vinyl aromatic polymers having an orderly structure may result in a polymer composition having elastomeric properties at a temperature range from −121° F. (188.15 K) to 572° F. (573.15 K).

More specifically, the polymer composition of the present invention allowing to achieve elastomeric behavior at wide temperature ranges comprises from 15 to 85% by weight of a copolymer having at least a block from 10 to 5000 structural sequences, which are mainly syndiotactic in nature, of monomer units resulting from at least one substituted or unsubstituted vinyl aromatic monomer, and at least one block formed from 10 to 4000 monomer units resulting from at least one dienic monomer having mainly a 1,4-cis structure; from 15 to 85% by weight of a polymer resulting from dienic monomers, having a molecular weight from 1000 to 600000, the contents of 1,4-cis-type monomer units being of at least 90%; and up to 70% of a polymer resulting from substituted or unsubstituted vinyl aromatic monomers, having a molecular weight from 1000 to 500000 and a degree of syndiotacticity in terms of syndiotactic pentads of at least 95%.

In a preferred embodiment of the present invention, vinyl aromatic monomers are selected from styrene and substituted styrene, the substituents being preferably selected from the alkyl, halide, alkoxyl, and amine groups. In a specific embodiment, vinyl aromatic monomers are selected from styrene, 4-methyl-styrene, 4-ter-butyl styrene, 4-methoxy styrene, 4-trimethylsililoxy styrene, 4-bromo styrene, and 4-(N,N-dimethylamine) styrene.

Regarding the dienic monomer, in the preferred embodiment of the present invention, the dienic monomer is selected from buta-1,3-diene and 2-methyl buta-1,3-diene.

In an additional embodiment of the polymer composition of the present invention, the fraction formed by the monomer units resulting from the dienic monomer may be partially or fully hydrogenated, that is, monomer units —$CH_2$—$CH$=$CH$—$CH_2$— may be partially or fully converted into the monomer units —$CH_2$—$CH_2$—$CH_2$—$CH_2$—, whereas the monomer units —$CH_2$—$C(CH$=$CH_2)H$— may be partially or fully converted into the monomer units —$CH_2$—$C(CH_2$—$CH_3)H$—, 95% of the monomer units resulting from the dienic monomer being preferably hydrogenated.

In an additional embodiment of the present invention, the polymer composition contains from 0.01 to 4% by weight of at least one organic or inorganic additive depending on the final destination of the composition and, more preferably, less than 3.7%.

Preferably, inorganic additives are selected from compounds containing aluminum and, more preferably, aluminum oxide, or compounds with the general formula (—Al(X)O—)n, wherein X is a hydroxyl, alkoxyde, or alkyl group, which are obtained by making react the compounds having the general formula (—Al(R)O—)m with water or alcohols, wherein R is an alkyl group, n and m are natural numbers which may be residues from the catalytic system.

Likewise, it is preferred that organic additives include at least one antioxidant agent, preferably selected from useful antioxidants in compositions containing styrene and butadiene and, more preferably, selected from those containing phenols, phosphates, and amines.

The polymer composition of the present invention has a first glass transition temperature ($T_g 1$) within the temperature range between –148° F. and –194° F.; a second glass transition temperature ($T_g 2$) within the temperature range between 203° F. and 248° F.; as well as a melting temperature $T_m$ within the temperature range between 428° F. and 572° F. The elastomeric behavior of the polymer composition of the present invention ranges from –121° F. up to the dienic-polymer degradation temperature. Likewise, the modulus of elasticity may vary between 10 and 1000 MPa within the temperature range between –121° F. and 194° F., and between 3 and 100 MPa within the temperature range between 248° F. and the dienic polymer temperature.

The polymer composition of the present invention may be prepared by a process comprising a first contact polymerization stage of at least one vinyl aromatic monomer which is polymerizable by a catalytic system as that comprising a pre-catalyzer consisting of one or more compounds pertaining to the class of compounds such as titanium fluorenyl trialkoxyde (IV), and an activating compound selected from aluminum compounds obtained by trialkylaluminum hydrolysis and, more preferably, a methyl aluminoxane, such as that depicted in the patent application MX 9801717, in mass form or with the presence of a dissolvent selected from aromatic dissolvent and, more preferably, toluene, as well as from aliphatic dissolvents and, more preferably, 2,2,4-trimethyl pentane, or a mixture thereof, at a temperature between 32° F. and 194° F. for a period of time between 1 and 30 minutes; such a contact being followed by a second polymerization stage through subsequent addition of a dienic monomer at a temperature between 32° F. and 158° F. to form an unsaturated polymer composition.

The unsaturated polymer composition is polymerized for period of time between 10 minutes and 6 hours, and it is then mixed with an alcohol selected from aliphatic alcohols in order to end the polymerization reaction. In a preferred embodiment of the present invention, the aliphatic alcohol has from 1 to 4 carbon atoms, with isopropanol being preferred.

Once the reaction has come to an end, the composition is finally subjected to a stage of catalytic residue removal by using a mixture of an aliphatic alcohol and a solvent with at least one substituted or unsubstituted aromatic ring. In a preferred embodiment of the present invention, the aliphatic alcohol:aromatic solvent ratio is between 0.5:1 and 5:1, with a 1:1 ratio being preferred. The aliphatic alcohol from the stage of catalytic residue removal is preferably selected from alcohols having between 1 and 4 carbon atoms, preferably isopropanol, with the preferred aromatic solvent being toluene.

In an additional embodiment of the present invention, it has been surprisingly found that, at the end of the dienic monomer polymerization stage or once the dienic monomer has been converted at least by 50%, the non-hydrogenated polymer composition may be subjected to a hydrogenation stage in situ by direct contact with hydrogen at a partial hydrogen pressure between 10 and 150 psig and a temperature between 32° F. and 194° F. and, more preferably, a partial hydrogen pressure between 20 and 100 psig and a temperature between 68° F. and 158° F. It is yet more surprising that the hydrogenation stage of the non-hydrogenated polymer composition may be performed without the need of using additional hydrogenation catalyzers, which results in materials having up to 95% of hydrogenated polybutadiene.

The polymer composition of the present invention will be illustrated more clearly by the following examples, which are presented only as an illustration and thus do not limit the same.

Polymerization processes were performed according to what is depicted below.

EXAMPLES 1-9

A glass reactor with capacity of 600 mL, provided with a stirring system, a temperature and pressure control system, and a reagent addition system, was charged with a mixture of: 30 mL toluene, 30 mL of a vinyl aromatic monomer (see Chart II) and 3 g of a dry methylaluminoxane. The reactor was heated to 122° F. and was kept at this temperature for 10 minutes. Then, a solution of $(C_9H_{13})Ti(OC_3H_7)_3$ in 5 mL toluene was added. The vinyl aromatic monomer/titanium compound molar ratio was of 1000, while the Al/Ti ratio was of 250. The reactor jacket begins to cool down from the addition of the starter compound. 20 seconds after the beginning of polymerization, the reactor was added 200 ml toluene which was previously cooled to 50° F. At time t1 from the beginning of the polymerization (see Chart II), 60 mL butadiene were added. The reaction was left to proceed for 2 hours. The reactive mixture was mixed with 1 L isopropanol.

In order to remove the catalytic system residue, the product was extracted using the continuous extraction apparatus for 24 hours with a mixture of toluene-isopropanol at a 1:1 ratio, except for the case of Example 8, which has a higher content of the D component, of which the catalytic residue is part.

In order to characterize the product, the resin was separated into one hexane-soluble fraction and one hexane-insoluble fraction. According to the NMR analysis of $^1$H and $^{13}$C, the hexane-soluble fraction consists of polybutadiene having from 91 to 95% of 1,4-cis monomer units, with the rest being 1,2 monomer units. According to the NMR results for 1H, as well as NMR for $^{13}$C and GPC, the hexane-insoluble fraction consists either of syndiotactic vinyl aromatic polymer block copolymer and highly 1,4-cis polybutadiene, or a mixture of syndiotactic vinyl aromatic polymer, syndiotactic vinyl aromatic polymer block copolymer, and highly 1,4-cis polybutadiene.

The characteristics of every polymer composition obtained are shown in Table II, which uses the same abbreviations as those in Table 1.

TABLE I-continued

| | |
|---|---|
| MeOSt | 4-methoxy styrene |
| 4NSt | 4-dimethylamine styrene |
| t1 | Polymerization time for vinyl aromatic monomer, minutes |
| $M_WA$ | Molecular weight of A by weight |
| cA, % | Contents of 1,4-cis monomer units in A dienic blocks |
| vA, % | Contents by weight of A vinyl aromatic blocks |
| PA, % | Contents of copolymer A in the composition by weight |
| $M_pB$ | Peak molecular weight of B |
| cB, % | Contents of 1,4-cis monomer units |
| PB, % | Contents of B in the composition by weight |
| $M_WC$ | Molecular weight of C by weight |
| PC, % | Contents of C in the composition by weight |
| PD, % | Contents of D in the composition by weight |
| Pv, % | Total contents of the vinyl aromatic portion in the composition by weight |
| SY, % | Degree of syndiotacticity of the vinyl aromatic portion |
| $T_g1$ | First glass transition temperature |
| $T_g2$ | Second glass transition temperature |
| $T_m$ | Melting transition temperature |
| ΔG' | Variation on the modulus of elasticity within the indicated temperature ranges |

TABLE II

| | EXAMPLE | | | | | | | | |
|---|---|---|---|---|---|---|---|---|---|
| Properties | 1 | 2 | 3 | 4 | 5 | 6 | 7 | 8 | 9 |
| V | St | St | St | St | St | St | St | 4Me St | 4Br St |
| t1 | 30 | 25 | 20 | 15 | 10 | 5 | 2.5 | 20 | 20 |
| Component (A) | | | | | | | | | |
| $M_WA$, ×10E−3 | 245 | 267 | 201 | 202 | 176 | 207 | 96 | 295 | 304 |
| cA, % | 92 | 93 | 93 | 93 | 92 | 93 | 91 | 95 | 93 |
| VA, % | 96 | 84 | 53.2 | 95.5 | 72.7 | 82.2 | 58.9 | 60.4 | 40.2 |
| PA, % | 30.2 | 33.2 | 36.8 | 22.6 | 19.3 | 19.5 | 17.5 | 46.5 | 15.3 |
| Component (B) | | | | | | | | | |
| $M_pB$, ×10E−3 | 246 | 231 | 256 | 385 | 485 | 450 | 284 | 233 | 297 |
| cB, % | 92.5 | 92.6 | 94.3 | 91.0 | 93 | 91 | 92.2 | 95 | 91.8 |
| PB, % | 66.2 | 64.8 | 55.0 | 76.5 | 78.9 | 80.0 | 79.5 | 39.4 | 67.6 |
| Component (C) | | | | | | | | | |
| $M_WC$, ×10E−3 | — | — | 25.6 | — | — | — | — | 50.7 | 62.3 |
| PC, % | 0 | 0 | 7.1 | 0 | 0 | 0 | 0 | 10.3 | 14.6 |
| Component (D) | | | | | | | | | |
| PD, % | 3.6 | 2 | 1.1 | 0.9 | 1.8 | 0.5 | 3 | 3.8 | 2.5 |
| Properties | | | | | | | | | |
| Pv, % | 29.0 | 27.9 | 26.7 | 22.0 | 15.6 | 16.0 | 10.3 | 38.4 | 20.8 |
| SY, % | 99.9 | 99.9 | 99.9 | 99.9 | 99.9 | 99.9 | 99.9 | 98 | 96.6 |
| $Tg_1$, °F. | −143.5 | −143.5 | −144.5 | −140.9 | −142.6 | −143.5 | −145.5 | −147.2 | −133.9 |
| $Tg_2$, °F. | 234 | 243.1 | 222 | 246.2 | 230 | 233 | 225 | 204 | 247.6 |
| $T_m$, °F. | 509 | 515 | 504.3 | 516.2 | 512 | 508 | 508.1 | 519.2 | 564.8 |
| ΔG', Mpa | | | | | | | | | |
| From −76° F. to 194° F. | — | — | — | 208.4-59 | 194-140 | 194-95 | 86-68 | — | — |
| From 248° F. to 482° F. | — | — | — | 39.2-37.4 | 77-59 | 44.6-39.2 | 44.6-42.8 | — | — |

TABLE I

| | |
|---|---|
| A | It generally refers to the properties of the (syndiotactic vinyl aromatic)-(1,4-cis-dienic) copolymer |
| B | It generally refers to the 1,4-cis dienic polymer properties |
| C | It generally refers to the syndiotactic vinyl aromatic polymer properties |
| D | Organic and inorganic additives |
| V | Vinyl aromatic monomer |
| St | Styrene |
| 4MeSt | 4-methyl styrene |
| 4BrSt | 4-bromo styrene |

EXAMPLES 10-18

A glass reactor with capacity of 600 mL, provided with a stirring system, a temperature and pressure control system, and a reagent addition system, was charged with a composed mixture of: 30 mL 2,2,4-trimethylpentane, 30 mL of a vinyl aromatic monomer (see Table III), and 3 g of a dry methylaluminoxane. The reactor was heated to 122° F. and was kept at this temperature for 10 minutes. Then, a solution of $(C_9H_{13})Ti(OC_3H_7)_3$ in 5 mL 2,2,4-trimethylpentane was added. The vinyl aromatic monomer/titanium compound molar ratio was of 1000, while the Al/Ti ratio was of 250. The reactor jacket begins to cool down from the addition of the starter compound. 20 seconds after the beginning of polymerization, the reactor was added 200 ml 2,2,4-trimethylpentane balanced to 68° F. At time t1 from the beginning of the polymerization (see Table III), 60 mL butadiene was added. The reaction was left to proceed for 2 hours. The reactive mixture was mixed with 1 L isopropanol.

In order to remove the catalytic system residue, the product was extracted using the continuous extraction apparatus for 24 hours with a mixture of toluene-isopropanol at a 1:1 ratio, except for the case of Example 10, which has a higher content of the D component, of which the catalytic residue is part.

In order to characterize the product, the resin was separated into one hexane-soluble fraction and one hexane-insoluble fraction.

According to the NMR analysis of $^1$H and $^{13}$C, the hexane-soluble fraction consists of polybutadiene having from 88 to 93% of 1,4-cis monomer units, with the rest being 1,2 monomer units.

According to the NMR results for $^1$H, as well as NMR for $^{13}$C and GPC, the hexane-insoluble fraction consists of a mixture of syndiotactic vinyl aromatic polymer, the syndiotactic vinyl aromatic polymer block copolymer, and highly 1,4-cis polybutadiene.

The characteristics of every polymer composition obtained are shown in Table III, which uses the same abbreviations as those in Table I.

conventional SBR elastomer. It is clearly seen that the modulus of elasticity (G') of the polymer composition of the present invention is maintained within the temperature range from −121° F. to 536° F., a range in which the material of the present invention does not flow. Conversely, a conventional elastomer loses its viscoelastic properties before the polystyrene-stage $T_g$ takes place, at about 158° F.

EXAMPLES 19-23

The process was the same as for Example 5. After 120 minutes of butadiene polymerization, the reactor was filled up with hydrogen at the partial pressure indicated in Table V and it was kept at such a pressure, as well as at the temperature shown in Table V for 24 hours. The reactive mixture was mixed with 1 L isopropanol.

In order to remove the catalytic system residue, the product was extracted using the continuous extraction apparatus for 24 hours with a mixture of toluene-isopropanol at a 1:1 ratio.

In order to characterize the product, the resin was separated into one hexane-soluble fraction, one hot heptane-soluble fraction, and one fraction that was insoluble in such dissolvents.

According to the NMR analysis of $^1$H and $^{13}$C, the hexane-soluble fraction consists of highly 1,4-cis polybutadiene.

According to the NMR analysis of $^1$H and $^{13}$C, the hot heptane-soluble fraction consists of hydrogenated polybutadiene.

According to the NMR results for $^1$H, as well as NMR for $^{13}$C and GPC, the fraction that was insoluble in both dissolvents consists of the syndiotactic polystyrene block copolymer and highly 1,4-cis hydrogenated polybutadiene.

TABLE III

| Properties | EXAMPLE | | | | | | | | |
|---|---|---|---|---|---|---|---|---|---|
| | 10 | 11 | 12 | 13 | 14 | 15 | 16 | 17 | 18 |
| V | St | St | St | St | St | St | St | St/MeOSt = 9/1 | St/4NSt = 9/1 |
| t1 | 30 | 25 | 20 | 15 | 10 | 5 | 2.5 | 15 | 5 |
| Component (A) | | | | | | | | | |
| $M_W$A, ×10E−3 | 248 | 201 | 220 | 195 | 151 | 175 | 499 | 193 | 333 |
| cA, % | 87.0 | 89.7 | 89.9 | 90.1 | 89.5 | 87.6 | 88.7 | 85 | 90.2 |
| vA, % | 76 | 71 | 58.5 | 59 | 53.5 | 43.5 | 40.5 | 10.5 | 21.5 |
| PA, % | 9.5 | 22.5 | 29.5 | 47.5 | 53.0 | 66.5 | 71.5 | 16.5 | 25.5 |
| Component (B) | | | | | | | | | |
| $M_p$B, ×10E−3 | 105 | 133 | 185 | 154 | 156 | 265 | 200 | 123 | 99 |
| cB, % | 88.7 | 90.6 | 91 | 89.2 | 90.3 | 89 | 88.1 | 93 | 91.8 |
| PB, % | 16.3 | 16.8 | 18.8 | 17.5 | 15.0 | 15.7 | 15.0 | 29.0 | 27.2 |
| Component (C) | | | | | | | | | |
| $M_W$C, ×10E−3 | 531 | 507 | 780 | 465 | 470 | 403 | 354 | 267 | 609 |
| PC, % | 70.2 | 57.2 | 51.1 | 32.0 | 31.0 | 14.2 | 10.5 | 51.1 | 44.8 |
| Component (D) | | | | | | | | | |
| PD, % | 4.0 | 3.5 | 2.8 | 3.0 | 1.0 | 3.6 | 3.0 | 3.4 | 2.5 |
| Properties | | | | | | | | | |
| Pv, % | 77.4 | 73.2 | 68.4 | 60.0 | 59.3 | 43.1 | 39.5 | 52.8 | 50.3 |
| SY, % | 99.9 | 99.9 | 99.9 | 99.9 | 99.9 | 99.9 | 99.9 | 98.2 | 97.1 |
| $T_{g_1}$, ° F. | −131.8 | −134.5 | −130.5 | −130.9 | −131.9 | −134.3 | −130.1 | −136.6 | −133.9 |
| $T_{g_2}$, ° F. | 239 | 241.1 | 242.6 | 235.7 | 239.9 | 238.1 | 248 | 200.3 | 249 |
| $T_m$, ° F. | 530 | 532.4 | 528.8 | 536 | 539.6 | 525.2 | 516.2 | 491 | 554 |
| ΔG', Mpa | | | | | | | | | |
| From −76° F. to 194° F. | — | — | — | — | — | — | 1832-1292 | 212-104 | — |
| From 240° F. to 482° F. | — | — | — | — | — | — | 400-300 | 104-212 | — |

The FIGURE compares the viscoelastic behavior of the polymer compositions of the present invention with that of a The characteristics of every polymer composition obtained are shown in Table V, which uses the same abbreviations as those in Table IV.

EXAMPLES 24-27

The process was the same as for Example 14. After 120 minutes of butadiene polymerization, the reactor was filled up with hydrogen at the partial pressure indicated in Table V and it was kept at such a pressure, as well as at the temperature shown in Table V for 24 hours. The reactive mixture was mixed with 1 L isopropanol.

In order to remove the catalytic system residue, the product was extracted using the continuous extraction apparatus for 24 hours with a mixture of toluene-isopropanol at a 1:1 ratio.

In order to characterize the product, the resin was separated into one hexane-soluble fraction, one hot heptane-soluble fraction, and one fraction that was insoluble in such dissolvents.

According to the NMR analysis of $^1H$ and $^{13}C$, the hexane-soluble fraction consists of highly 1,4-cis polybutadiene.

According to the NMR analysis of $^1H$ and $^{13}C$, the hot heptane-soluble fraction consists of hydrogenated polybutadiene.

According to the NMR results for $^1H$, as well as NMR for $^{13}C$ and GPC, the fraction that was insoluble in both dissolvents consists of the syndiotactic polystyrene block copolymer and highly 1,4-cis hydrogenated polybutadiene.

The characteristics of every polymer composition obtained are shown in Table V, which uses the same abbreviations as those in Table IV.

TABLE IV

| | |
|---|---|
| A | It generally refers to the properties of the (syndiotactic vinyl aromatic)-(1,4-cis-dienic hydrogenated) copolymer |
| B | It generally refers to the 1,4-cis dienic polymer properties |
| BH | It generally refers to the 1,4-cis dienic hydrogenated polymer |
| C | It generally refers to the syndiotactic vinyl aromatic polymer properties |
| D | Organic and inorganic additives |
| P | Hydrogen pressure in psig |
| T, ° C. | Hydrogenation temperature |
| $M_W A$ | Molecular weight of A by weight |
| hA, % | Fraction of hydrogenated monomer units in A dienic blocks |
| PA, % | Contents of copolymer A in the composition by weight |
| $M_p B$ | Peak molecular weight of B |
| PB, % | Contents of B in the composition by weight |
| $M_W BH$ | Molecular weight of BH by weight |
| hBH, % | Fraction of hydrogenated monomer units |
| PBH, % | Contents of BH in the composition by weight |
| $M_W C$ | Molecular weight of C by weight |
| PC, % | Contents of C in the composition by weight |
| PD, % | Contents of D in the composition by weight |
| $T_g 1$ | First glass transition temperature |
| $T_g 2$ | Second glass transition temperature |
| $T_m$ | Melting transition temperature |
| ΔG' | Variation on the modulus of elasticity within the indicated temperature ranges |

TABLE V

| | EXAMPLE | | | | | | | | |
|---|---|---|---|---|---|---|---|---|---|
| Properties | 19 | 20 | 21 | 22 | 23 | 24 | 25 | 26 | 27 |
| P, psig | 10 | 20 | 60 | 80 | 80 | 40 | 60 | 80 | 80 |
| T, ° F. | 68 | 158 | 122 | 122 | 158 | 104 | 122 | 122 | 158 |
| Component (A) | | | | | | | | | |
| $M_W A$, ×10E−3 | 185 | 171 | 182 | 190 | 188 | 150 | 135 | 172 | 170 |
| hA, % | 0 | 27 | 68 | 86 | 95 | 5 | 44 | 71 | 89 |
| PA, % | 27 | 21 | 23 | 27 | 26 | 14 | 14 | 15 | 12 |
| Component (B) | | | | | | | | | |
| $M_p B$, ×10E−3 | 263 | 151 | 128 | 101 | 360 | 133 | 105 | 71 | 287 |
| PB, % | 60 | 61 | 39 | 14 | 2 | 50 | 38 | 21 | 5 |
| Component (BH) | | | | | | | | | |
| $M_W BH$, ×10E−3 | 15 | 65; 4 | 122; 3 | 120; 3 | 99; 1.5 | 3 | 131; 2.5 | 125; 2 | 102; 1.5 |
| hBH, % | 55 | 62 | 85 | 93 | 98 | 75 | 83 | 95 | 99 |
| PBH, % | 10 | 16 | 36 | 57 | 70 | 26 | 39 | 54 | 75 |
| Component (C) | | | | | | | | | |
| $M_W C$, ×10E−3 | — | — | — | — | — | 465 | 482 | 290 | 472 |
| PC, % | 0 | 0 | 0 | 0 | 0 | 9 | 8 | 9 | 7 |
| Component (D) | | | | | | | | | |
| PD, % | 2 | 2 | 2 | 2 | 2 | 1 | 1 | 1 | 1 |
| Properties ΔG', Mpa | | | | | | | | | |
| From −76° F. to 194° F. | — | 176-95 | — | — | — | 44.6-33.4 | — | — | — |
| From 284° F. to 482° F. | — | 64.4-60.8 | — | — | — | 33.2-33.8 | — | — | — |

According to what has been depicted above, it may be seen that the polymer composition with elastomeric properties at wide temperature ranges of the present invention has been designed to comply with the requirements as of elastomeric properties that are needed for applications at a temperature range from −112° F. to 536° F., and it will be apparent for the one skilled in the art that the embodiments of the polymer composition depicted before and illustrated in the preceding examples, are only illustrative in purpose and do not limit the present invention, since may changes in details are possible without departing from the scope of the invention.

Although one specific embodiment of the invention has been illustrated and depicted, it must be emphasized that many modifications to the same are possible, such as the use of several additives, substituents of vinyl aromatic monomer, or various conjugated dienic monomers. Thus, the present invention shall not be construed to be restricted except for the requirements of the previous art and according to the appended claims and their interpretation according to the present detailed description.

The invention claimed is:

1. A process for preparing a polymer composition with elastomeric properties at wide temperature ranges of the type comprising a first polymerization of at least one vinyl aromatic monomer which is polymerizable by a catalytic system comprising a pre-catalyzer consisting of titanium fluorenyl trialkoxide, and an activating compound selected from aluminum compounds obtained by trialkylaluminum hydrolysis, through subsequent addition of a dienic monomer and, secondly polymerizing third stage by mixing a reactive mixture with an alcohol in order to form a non-hydrogenated polymer composition, wherein a catalytic residue removal stage is then performed by using a mixture of an aliphatic alcohol with a solvent having at least one substituted or unsubstituted aromatic ring.

2. The process to prepare a polymer composition according to claim 1, wherein the aliphatic alcohol: aromatic solvent ratio ranges between 0.5:1 and 5:1.

3. The process to prepare a polymer composition according to claim 2, wherein the aliphatic alcohol: aromatic solvent ratio is of 1.1.

4. The process to prepare a polymer composition according to claim 1, wherein the aliphatic alcohol from the catalytic residue removal stage is selected from alcohols having from 1 to 4 carbon atoms.

5. The process to prepare a polymer composition according to claim 4, wherein the aliphatic alcohol from the catalytic residue removal stage is iso-propanol, whereas the aromatic solvent is toluene.

6. The process to prepare a polymer composition according to claim 1, wherein the pre-catalyzer component is titanium fluorenyl triisopropoxide.

7. The process to prepare a polymer composition according to claim 1, wherein the activating component is a methylaluminoxane.

8. The process to prepare a polymer composition according to claim 1, wherein the vinyl aromatic monomer is polymerized in mass or with the presence of a dissolvent.

9. The process to prepare a polymer composition according to claim 8, wherein the dissolvent is selected from aromatic dissolvents, aliphatic dissolvents, or a mixture thereof.

10. The process to prepare a polymer composition according to claim 9, wherein the aromatic dissolvent is toluene.

11. The process to prepare a polymer composition according to claim 9, wherein the aliphatic dissolvent is 2,2,4-trimethyl pentane.

12. The process to prepare a polymer composition according to claim 1, wherein the contact of the polymerizable vinyl aromatic monomer with the catalytic system is performed at a temperature from 32° F. to 194° F. and for a period of time from 1 to 30 minutes.

13. The process to prepare a polymer composition according to claim 1, wherein the contact of the polymerizable vinyl aromatic monomer with the catalytic system is performed at a temperature from 68° F. to 122° F. and for a period of time from 1 to 30 minutes.

14. The process to prepare a polymer composition according to claim 1, wherein the polymerization stage of the dienic monomer is performed at a temperature from 32° F. to 158° F.

15. The process to prepare a polymer composition according to claim 1, wherein the first and second polymerization stages are performed in a period of time from 10 minutes to 6 hours.

16. The process to prepare a polymer composition according to claim 1, wherein the alcohol is an aliphatic alcohol.

17. The process to prepare a polymer composition according to claim 16, wherein the alcohol is iso-propanol.

18. The process for preparing a polymer composition according to claim 1, wherein the non-hydrogenated polymer composition is subjected to a hydrogenation stage through direct contact with hydrogen without the need of using additional hydrogenation catalyzers and, followed by a stage that includes mixing the reactive mixture with an alcohol in order to form a hydrogenated polymer composition.

19. The process to prepare a polymer composition according to claim 18, wherein the hydrogenation stage is performed at a partial hydrogen pressure from 10 to 150 psig.

20. The process to prepare a polymer composition according to claim 19, wherein the partial hydrogen pressure is from 20 to 100 psig.

21. The process to prepare a polymer composition according to claim 18, wherein the hydrogenation stage begins once the dienic monomer has been converted by at least 50% in the second polymerization stage.

22. The process to prepare a polymer composition according to claim 18, wherein the hydrogenation stage is performed at a temperature from 32° F. to 194° F.

23. The process to prepare a polymer composition according to claim 22, wherein temperature ranges between 68° F. and 158° F.

24. The process to prepare a polymer composition according to claim 18, wherein the dienic monomer is converted by at least 95%.

25. The process to prepare a polymer composition according to claim 18, wherein the resulting materials have at least 95% of hydrogenated polybutadiene.

* * * * *